United States Patent Office 3,128,297

Patented Apr. 7, 1964

1

3,128,297

PROCESS FOR SILICON-HALOGEN BOND REDISTRIBUTION

Bernard Kanner, Tonawanda, and Donald L. Bailey, Snyder, N.Y., assignors to Union Carbide Corporation, a corporation of New York No Drawing. Filed Mar. 31, 1961, Ser. No. 99,667
20 Claims. (Cl. 260—448.2)

This invention relates to a process for the redistribution of silicon-halogen chemical bonds. More particularly, the invention is directed to a process for the redistribution of silicon-fluorine and other silicon-halogen bonds, preferably silicon-chlorine bonds, in organo-silicon compounds. This application is a continuation-in-part of our copending application Serial No. 15,841, filed March 18, 1960, now abandoned.

We have discovered that an efficient and rapid redistribution of silicon-fluorine and other silicon-halogen bonds takes place at moderate temperatures when an organo-silicon compound or mixture of organo-silicon compounds wherein there is at least one silicon-fluorine bond and at least one other different silicon-halogen bond is contacted with a basic catalyst. For example, if trimethylfluorosilane and methyltrichlorosilane are contacted with triethylamine at about room temperature a redistribution reaction takes place according to the equation:

(A)

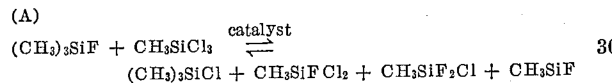

$$(CH_3)_3SiF + CH_3SiCl_3 \underset{}{\overset{\text{catalyst}}{\rightleftharpoons}} (CH_3)_3SiCl + CH_3SiFCl_2 + CH_3SiF_2Cl + CH_3SiF$$

The methods heretofore proposed for the redistribution of silicon-halogen bonds resulted in extremely slow reactions even at relatively high temperatures. For example, in J. Am. Chem. Soc., vol. 70, 3068, (1948), it was reported that trimethylchlorosilane did not react with $FSi(Me_2)CH_2SiMe_2F$ to any detectable extent. When aluminum chloride, a Lewis acid, was added to the mixture a very slow redistribution reaction took place at elevated temperatures. Another article in the J. Am. Chem. Soc., vol. 72, 2091, (1950), reports that the redistribution reaction involving $SiCl_4$ and $SiF_4$ proceeded very slowly even at 740° C. It was estimated that a temperature of 900° C. to 1000° C. would be required to attain an equilibrium mixture of redistribution products within a reasonably short reaction time.

It is, therefore, an object of this invention to provide a process for the redistribution of silicon-fluorine and other different silicon-halogen bonds in organo-silicon compounds which is not subject to the disadvantages of the methods heretofore known.

An additional object of this invention is to provide an efficient process for the production of organo-silicon compounds containing silicon-fluorine and/or other silicon-halogen bonds.

A further object of this invention is to provide a process for producing organo-functional silicon halide compounds containing functional groups in the organic portion of the molecule.

A still further object of the invention is to provide a process for the purification of chlorosilanes, bromosilanes and iodosilanes.

Other objects will be apparent from the following detailed description and the appended claims.

Broadly stated the process of this invention comprises contacting an organo-silicon compound or mixture of organo-silicon compounds (provided, of course, that in these organo-silicon compounds there is at least one silicon-fluorine bond and at least one other different silicon-halogen bond) with a basic catalyst and heating the resulting mixture to a temperature sufficiently elevated to cause the silicon-halogen bond redistribution to take place.

2

The various operable organo-silicon compounds, operable catalysts and reaction conditions will now be defined in more detail. The term "halogen" as used herein includes the elements fluorine, chlorine, bromine and iodine.

Monomeric silanes which can be employed as reactants in the process of this invention may be represented by the formula:

(B)

$$(Y{-}R{-})_e\overset{R'_f}{\overset{|}{Si}}X_{4-e-f}$$

wherein R is a divalent hydrocarbon group, the Y group is hydrogen, fluoro, chloro, bromo, iodo, cyano,

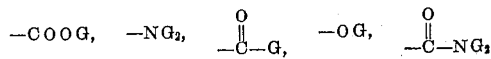

$$-COOG,\quad -NG_2,\quad -\overset{O}{\overset{\|}{C}}-G,\quad -OG,\quad -\overset{O}{\overset{\|}{C}}-NG_2$$

or nitro, the R′ group is hydrogen, the vinyl group or an Y—R— group, X is a halogen, G is a monovalent hydrocarbon group, *e* is an integer having a value from 0 to 3, f is an integer having a value from 0 to 1 and the sum of *e* and *f* is never greater than 3.

The divalent hydrocarbon group R is preferably one containing between one and 17 carbon atoms and may be an alkylene group such as methylene, ethylene, butylene-(1,4), hexylene(1,2), 2-ethylhexylene(1,6 and the like, a cycloalkylene group such as cyclopentylene(1,3), cyclohexylene(1,4), 3-octylcyclohexylene(1,4) and the like and an arylene or alkarylene group such as phenylene(1,4), naphthalene(1,4), 2-ethylphenylene(1,4)

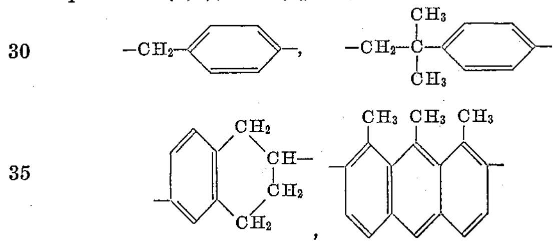

and the like.

The monovalent hydrocarbon group G is preferably one containing from one to 10 carbon atoms and may be alkyl, cycloalkyl, aryl or alkaryl. Examples of the group G are methyl, ethyl, isobutyl, hexyl, 2-ethylhexyl, cyclopentyl, 2-ethylcyclohexyl, phenyl, tolyl, mesityl, cumyl, and naphthyl.

Typical monomers which can be employed in this process are silicon tetrachloride,
methyltrichlorosilane,
phenyltrichlorosilane,
naphthyltrichlorosilane,
ethyltrichlorosilane,
tricholorosilane,
methyldichlorosilane,
phenyldichlorosilane,
dimethyldichlorosilane,
diphenyldichlorosilane,
phenylmethyldichlorosilane,
trimethylchlorosilane,
phenyldimethylchlorosilane,
dichlorosilane,
bis-trichlorosilylbenzene,
tolydiphenylchlorosilane,
beta-cyanoethyltrichlorosilane,
m-fluorophenylvinyldichlorosilane,
p-iodobenzyltrifluorosilane,
nitrophenyltrichlorosilane,
bis-nitrophenyldichlorosilane,
cyanophenylmethyldichlorosilane,
gamma-chloroisobutyltrichlorosilane,
gamma-cyanopropyltrichlorosilane,
beta-carbethoxyethyldichlorosilane, delta-nitrobutylmethyldichlorosilane,
4-trichlorosilyl-N,N-dimethylbenzamide,
delta-bromobutyltrichlorosilane,
methoxyphenyltrichlorosilane,
phenyltrifluorosilane,
diphenyldifluorosilane,
silicon tetrafluoride,
methylvinyldifluorosilane,
beta-cyanoethyltrifluorosilane,
gamma-chloroisobutyltrifluorosilane,
gamma-(N-methyl-N-phenylamino)propyltrifluorosilane,
beta-phenoxyethylmethyldifluorosilane,
nitronaphthylmethyldifluorosilane,
beta-phenylethyltrifluorosilane,
silicon tetrabromide,
methyltribromosilane,
phenyltribromosilane,
naphthyltribromosilane,
ethyltribromosilane,
tribromosilane,
methyldibromosilane,
phenyldibromosilane,
dimethyldibromosilane,
diphenyldibromosilane,
phenylmethyldibromosilane,
trimethylbromosilane,
phenyldimethylbromosilane,
dibromosilane,
tolydiphenylbromosilane,
beta-cyanoethyltribromosilane,
beta-carbethoxyethylmethyldibromosilane,
nitrophenyltribromosilane,
bis-nitrophenyldibromosilane,
cyanophenylmethyldibromosilane,
gamma-chloroisobutyltribromosilane,
beta-carbethoxypropyltribromosilane,
gamma-cyanopropyltrichlorosilane,
delta-nitrobutylmethyldibromosilane,
delta-N,N-dimethylaminobutyldimethylbromosilane,
delta-bromobutyltribromosilane,
N,N-diethylaminophenylmethyldibromosilane,
methoxyphenyltribromosilane,
beta-methoxyethylmethyldibromosilane,
delta-ethylmercaptobutyltribromosilane,
silicon tetraiodide,
methyltriiodosilane,
phenyltriiodosilane,
naphthyltriiodosilane,
ethyltriiodosilane,
triiodosilane,
methyldiiodosilane,
phenyldiiodosilane,
dimethyldiiodosilane,
diphenyldiiodosilane,
phenylmethyldiiodosilane,
trimethyliodosilane,
phenyldimethyliodosilane,
diiodosilane,
tolyldiphenyliodosilane,
beta-cyanoethyltriiodosilane,
beta-carbethoxyethylmethyldiiodosilane,
nitrophenyltriiodosilane,
bis-nitrophenyldiiodosilane,
cyanophenylmethyldiiodosilane,
gamma-chloroisobutyltriiodosilane,
beta-carbethoxypropyltriiodosilane,
gamma-cyanopropyltriiodosilane,
delta-nitrobutylmethyldiiodosilane,
delta-N,N-dimethylaminobutyldimethyliodosilane,
delta-bromobutyltriiodosilane,
N,N-diethylaminophenylmethyldiiodosilane
methoxyphenyltriiodosilane,
beta-methoxyethylmethyldiiodosilane,
delta-ethylmercaptobutyltriiodosilane, and the like.

Also included in the operable monomeric silanes are mixed chloro-, bromo- iodo- and fluorosilanes such as dimethylfluorochlorosilane, 4-acetylphenylmethylchlorofluorosilane, phenyldichlorofluorosilane, beta-cyanoethyldifluorochlorosilane, diethylchlorobromosilane, phenylfluorobromoiodosilane and nitrophenylmethylfluorochlorosilane and the like.

Linear and cyclic polysiloxane polymers can also be used in the process of this invention. Operable linear polysiloxanes can be represented by the formula:

(C)

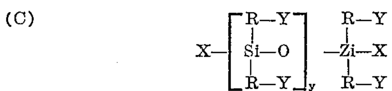

wherein R, Y and X have the meanings defined hereinabove and $y$ is an integer having a value from 1 to 10,000. Examples of operable linear siloxanes are 1,5-dichlorohexamethyltrisiloxane, 1,3-dichlorotetramethyldisiloxane, 1,3-difluorotetraphenyltrisiloxane, 1,7-dichlorooctamethyltetrasiloxane, 1,5-dibromohexamethyltrisiloxane, 1-chloro, 3-iodo-tetramethyldisiloxane, and the like.

The cyclic polysiloxane polymers which can be employed in the process of this invention may be represented by the formula:

(D)

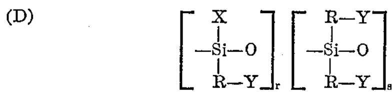

wherein R, Y,X have the meanings defined hereinabove, $r$ is an integer having a value from 1 to 3 and $s$ is an integer having a value from 2 to 10 with a preferred range of from 2 to 4. Examples of operable cyclic polysiloxanes include chloroheptamethylcyclotetrasiloxane, chloropentamethylcyclotrisiloxane, iodopentamethylcyclotrisiloxane, dibromohexamethylcyclotetrasiloxane, fluoroheptaethylcyclotetrasiloxane, and the like.

The redistribution process of this invention applies to mixtures of silanes, linear polysiloxanes and cyclic polysiloxanes, and includes the redistribution of silicon-fluorine bonds with mixtures of silicon-chlorine, silicon-bromine and silicon-iodine bonds.

The operable basic catalysts in the process of the present invention are tertiary amines, tri(monovalent hydrocarbon group) phosphines and silylamines. The term "tertiary amine" as used herein means a class of compounds wherein all three normal valences of the nitrogen atoms in such compounds are bonded to carbon atoms of hydrocarbon moieties. Thus, the term "tertiary amines" includes tri(monovalent hydrocarbon group) amines and pyridines, for example, triethylamine triisopropylamine, t-butyldimethylamine, cumyldimethylamine, and 2,2-bipyridyl. Examples of operable tertiary amines catalysts are tri-n-butylamine, trimethylamine, methylethylpropylamine, tri-n-heptylamine, triethylamine, ethylhexyloctylamine, N,N-dimethylaniline, N-methyl-N-butylaniline, alpha-methyldimethylbenzylamine, tribenzylamine, triphenylamine, N-methyl-alpha naphthyl-phenylamine, pyridine, quinoline, alpha-picoline, isoquinoline, 2,2-bipyridyl, 2,2-biquinolyl, 2,6-lutidine, 2,4,6-trimethylpyridine, 2-methylquinoline, N-methylmorpholine, and the like.

Examples of tri(monovalent hydrocarbon group) phosphine compounds which are operable catalysts in the process of the present invention are tributylphosphine, triphenylphosphine, phenyldiethylphosphine, methyldibutylphosphine, phenyltolylbutylphosphine, tribenzylphosphine, ethylbutylhexylphosphine and the like.

The silylamines which are operable catalysts in the present invention may be represented by the formula:

(E) $$G_m{-}Si(NG_2)_{4-m}$$

wherein G has the meaning defined above with reference to formula B, and $m$ is an integer having the value of zero to three. Examples of the silylamines that may be employed in this process are trimethyl-N,N-dimethylaminosilane, dimethyldi-N,N-diethylaminosilane, phenyltri-N,N-dibutylaminosilane and the like.

Ammonia, primary amines and secondary amines may also be used, indirectly, as catalysts for the process of the present invention. When these compounds are added to a mixture of halosilanes they react at the silicon-fluorine or other silicon-halogen bonds to give silylamines and other products. The silylamines thus formed are included in Formula E hereinabove and catalyze the redistribution reaction of this invention.

The redistribution reaction of this invention can be carried out without the use of a solvent. However, inert solvents can be used if desired, and are frequently beneficial when one or more of the reactants is a polysiloxane. The term "inert" indicates that the solvent does not react with silicon-halogen bonds or with functional groups on the organic portion of the organo-silicon compounds. Examples of operable inert solvents are benzene, hydrocarbon-substituted benzenes, such as toluene, xylene, cumene and tetrahydronaphthalene, hydrocarbons such as heptane, octane and petroleum ether and ethers such as diethyl ether, dibutyl ether, dioxane, tetrahydrofuran, ethylene glycol dimethyl ether and diethylene glycol dimethyl ether.

The temperature at which the base catalyzed redistribution reaction of the present invention takes place is not critical. The reaction generally takes place rapidly at moderate temperatures thus providing an exceptionally efficient process. The preferred operating temperature range is from about −20° C. to about 200° C. but higher or lower temperatures may be used if desired.

Pressure is also not a critical factor in the process of this invention. The most convenient pressure for carrying out the reaction is atmospheric pressure. However, the reaction can be carried out under pressure, if desired, and it is also frequently advantageous to use subatmospheric pressures when it is desired to carry the redistribution reaction to completion. This feature of the process will be discussed in more detail below.

The reaction times necessary to effect redistribution of the silicon-fluorine and other silicon-halogen bonds according to the process of this invention are likewise not critical. The exact length of time required to form an equilibrium mixture of redistributed products varies, of course, with the temperature, the nature of the organosilicon compounds and the particular catalyst present. It can be stated in general, however, that redistribution to an equilibrium mixture takes place within relatively very short periods of time.

It is pointed out that the redistribution process of the present invention does not require the presence of two different halosilanes, or halosiloxanes. A single compound is sufficient as long as it contains at least one silicon-fluorine bond and at least one other different silicon-halogen bond. For example, phenylfluorodichlorosilane in the presence of a tertiary amine undergoes a redistribution reaction to give a mixture of products which include phenyltrichlorosilane and phenyldifluorochlorosilane. In the case of dimethylfluorochlorosilane the silicon-halogen bonds redistribute and the reaction mixture contains dimethyldichlorosilane and dimethyldifluorosilane.

As used herein the terms "chlorosilane," "bromosilane," "iodosilane" and "fluorosilane" refer to compounds containing silicon-chlorine bonds, silicon-bromine bonds, silicon-iodine bonds, silicon-fluorine bonds or mixtures of such bonds regardless of the functional groups present in the organic portion of the molecule. Thus, gamma-chloropropyltrifluorosilane is a fluorosilane and gamma-iodopropylfluorodichlorosilane is a fluorosilane and a chlorosilane.

In the description of the invention hereinbelow, the following abbreviations are employed: Me=methyl, Et=ethyl, iBu=iso-butyl, Ac=acetyl, Vi=vinyl, $\phi$=phenyl and DMF=N,N-dimethylformamide. Also, a figure in degrees written under the formula for a chemical compound indicates the normal (atmospheric pressure) boiling point of the compound in degrees centigrade. In order to emphasize the principal reactions taking place, the chemical equations hereinbelow are not balanced and show only the primary reaction products.

By appropriate methods, the redistribution reaction of the present invention can be driven to completion thus providing a route for the preparation of various compounds containing silicon-fluorine and other silicon-halogen bonds. For example, the process shown in Equation A above can be driven to completion by using a stoichiometric excess of one of the reactants or by removing one or more of the products from the reaction mixture.

In particular, many fluorosilanes are desirable as reaction intermediates and for other purposes. Methods heretofore known for preparing fluorosilanes had certain serious disadvantages. For example, one method was to react an appropriate halosilane with an alkali metal fluorosilicate such as $Na_2SiF_6$ (F) $\phi_2SiCl_2+Na_2SiF_6\rightarrow\phi_2SiF_2+SiF_4+2NaCl$ While this is a convenient laboratory procedure it is commercially undesirable to employ large amounts of solids as required by the reaction. In addition, many halosilanes are not normally reactive towards $Na_2F_6$ because of relatively low boiling points.

Another method heretofore used involved the reaction of a halo-silicon compound with certain metal fluorides such as $SbF_3$.

(G) $C_6H_5SiCl_3+SbF_3\rightarrow SbCl_3+C_6H_5SiF_3$

This procedure is also unattractive commercially because of the cost and inconvenience of handling metal fluorides and because of the low reactivity of volatile halosilanes.

By driving the rapid redistribution reaction of the present invention to completion an efficient process for the production of a wide variety of fluoro-silicon or other halo-silicon compounds is obtained. For example, the redistribution of phenyltrifluorosilane with silicon tetrachloride readily goes to completion because one of the products, silicon tetrafluoride is extremely volatile and leaves the reaction mixture as a gas as rapidly as it is formed.

(H)

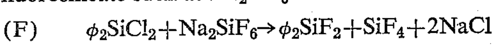

$$\phi SiF_3+SiCl_4\xrightarrow{G_3N}\phi SiCl_3+SiF_4$$

$G_3N$ represents a tri(monovalent hydrocarbon group) amine, G having been defined with reference to Formula B above. The yield of phenyltrichlorosilane is also improved by using an excess of silicon tetrachloride.

By taking advantage of differences in boiling point, one can readily convert a fluorosilicon compound to a chloro-silicon compound or other halo-silicon compound or vice versa. Thus to convert methyldichlorosilane to methyldifluorosilane the former is reacted with a fluorosilane having a higher boiling point in the presence of a catalyst such as a tertiary amine. As methyldifluorosilane is the most volatile component of the system, it is readily removed by distillation.

(I)

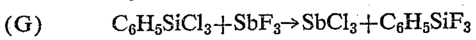

$$\underset{101^\circ}{\phi SiF_3}+\underset{42^\circ}{MeSiHCl_2}\xrightarrow{G_3N}\underset{-33^\circ}{MeSiHF_2}+\underset{200^\circ}{\phi SiCl_3}$$

Similarly, if it is desired to convert gamma-cyanopropylmethyldifluorosilane to the corresponding chlorosilane it is reacted with a lower boiling chlorosilane such as silicon tetrachloride. Gamma-cyanopropylmethyldichlorosilane is produced in good yield as the reaction is driven to completion by the evolution of silicon tetrafluoride.

(J)

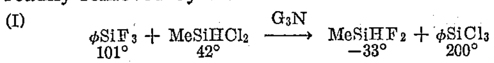

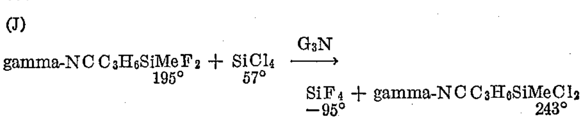

$$\text{gamma-}\underset{195^\circ}{NCC_3H_6SiMeF_2}+\underset{57^\circ}{SiCl_4}\xrightarrow{G_3N}\underset{-95^\circ}{SiF_4}+\text{gamma-}\underset{243^\circ}{NCC_3H_6SiMeCl_2}$$

In general the starting materials which can be used when the redistribution reaction is to be driven to completion are the silanes and polysiloxanes outlined in Formulas B, C and D hereinabove. It is, of course, necessary that an excess of at least one of these reactants may be used or that at least one of the products may be removed from the reaction mixture. The detailed procedures by which the redistribution reaction is driven to completion depend, therefore, on the nature of the individual reaction mixture and the appropriate procedures will be apparent to those skilled in the art. Several desirable procedures are described in the illustrative examples appearing hereinbelow.

Example 1 through 11 hereinbelow are illustrative of the general nature of the redistribution process of the present invention and of the use of this process in isolating various chloro-, bromo-, iodo- and fluorosilanes.

EXAMPLE 1

The following were combined in a 200 milliliter distillation flask: 46 grams (0.41 mole) of trimethylchlorosilane, 120 grams (0.74 mole) of phenylmethyldifluorosilane and 1 gram of tri-n-hexylamine. The mixture was heated at its boiling point and trimethylfluorosilane as formed was continuously removed by distillation through a packed column. A total of 34.5 grams of trimethylfluorosilane having a boiling point of 20° C. was recovered. This represented an 88 percent conversion of the trimethylchlorosilane to trimethylfluorosilane.

EXAMPLE 2

The following were combined in a 500 milliliter distillation flask: 101.5 grams (0.50 mole) nitrophenylmethyldifluorosilane, 127.5 grams (0.75 mole) of silicon tetrachloride and 1 gram of tri-n-heptylamine. Upon the addition of the amine to the reactants at room temperature an immediate and vigorous evolution of silicon tetrafluoride gas took place. The reaction appeared to be substantially complete in less than one hour. The reaction mixture was allowed to remain at room temperature overnight and was then fractionally distilled through a packed column. A total of 109 grams of nitrophenylmethyldichlorosilane having a boiling point of 103° C. to 109° C. at 2 mm. was collected. This represents a 90 percent conversion of nitrophenylmethyldifluorosilane to nitrophenylmethyldichlorosilane.

EXAMPLE 3

The following were placed in a 500 milliliter distillation flask: 81.5 grams (0.50 mole) of phenyltrifluorosilane, 125.5 grams (0.74 mole) of silicon tetrachloride and 0.5 gram of tri-n-hexylamine. Upon addition of the amine to the reactants at room temperature a vigorous evolution of silicon tetrafluoride gas took place and the temperature of the reaction mixture dropped to below room temperature. The reaction mixture was then rapidly fractionated through a short Vigreux column to yield 25.5 grams of silicon tetrachloride, 7 grams of material having a boiling point range of 128° C. to 192° C. and 95.4 grams of phenyltrichlorosilane having a boiling point of 192° C. to 198° C. A pot residue of less than 4 grams remained. A 90 percent conversion of phenyltrifluorosilane to phenyltrichlorosilane was obtained.

EXAMPLE 4

Following the procedure of Example 3 phenyltrifluorosilane was converted in high yield to phenyltrichlorosilane using phenyldiethylphosphine as a catalyst.

EXAMPLE 5

Following the procedures of Example 3 phenyltrifluorosilane was converted in high yield to phenyltrichlorosilane using trimethyl-N,N-diethylaminosilane as the catalyst.

EXAMPLE 6

The following were placed in a one liter distillation flask: 250 grams (1.54 moles) of phenyltrifluorosilane, 175 grams (1.52 moles) of methyldichlorosilane and 2 grams of tri-n-hepytlamine. The reaction mixture was heated at its boiling point. The volatile products were fractionated through a packed gas distillation column. About 60 grams of methyldifluorosilane and about 40 grams of methylchlorofluorosilane were obtained.

EXAMPLE 7

The following were combined in a one liter distillation flask: 131 grams (0.422 mole) of bis(nitrophenyl) difluorosilane, 136 grams (0.8 mole) of silicon tetrachloride, 100 milliliters of benzene and 0.5 milliliter of tri-n-heptylamine. Upon mixing an imediate evolution of gas took place. After the evolution of gas had subsided the reaction mixture was heated at its boiling point for 2 hours and then cooled to room temperature. On cooling overnight crystals precipitated out of the reaction mixture. The crystals were separated from the reaction mixture and purified by washing with diethyl ether. The purified crystals weighed 109 grams and were identified as bis(nitrophenyl)dichlorosilane. This example illustrates the use of an inert solvent and also illustrates the recovery of a desired product by crystallization techniques.

EXAMPLE 8

The following were placed in a 2 liter distillation flask: 479 grams (3.2 moles) of gamma-cyanopropylmethyldifluorosilane, 1091.4 grams (6.4 moles) of silicon tetrachloride, 3 grams of tri-n-heptylamine and 1 gram of trilaurylamine. An exothermic reaction took place at about room temperature. To insure complete reaction the mixture was maintained at 60° C. for 15 hours with stirring. Unreacted silicon tetrachloride was removed by fractional distillation at atmospheric pressure. The remaining crude product was further distilled at atmospheric pressure and 511.5 grams of gamma-cyanopropylmethyldichlorosilane having a boiling point of 242° C. to 244° C. was recovered. This represents an 87.5 percent conversion of gamma-cyanopropylmethyldifluorosilane to gamma-cyanopropylmethyldichlorosilane.

EXAMPLE 9

The following were combined in a 200 milliliter distillation flask: 32 grams (0.20 mole) phenylmethyldifluorosilane, 52 grams (0.20 mole) of silicon tetrabromide and 0.3 milliliter of phenyldiethylphosphine. Upon the addition of the phosphine to the reactants at room temperature an immediate evolution of silicon tetrafluoride gas took place. The reaction mixture was heated to its boiling point and was then fractionally distilled through a 12 inch Vigreux column. A total of 49 grams of phenylmethyldibromosilane having a boiling point of 232° C. to 237° C. at atmospheric pressure was collected. This represents an 87 percent conversion of phenylmethyldifluorosilane to phenylmethyldibromosilane.

EXAMPLE 10

Following the procedure of Example 9, phenylmethyldifluorosilane and silicon tetraiodide are mixed and phenyldiethylphosphine is added. The reaction mixture is then heated to its boiling point and fractionally distilled. The principal product recovered is phenylmethyldiodosilane.

EXAMPLE 11

The following were combined in a 200 milliliter distillation flask: 26.4 grams (0.177 mole) gamma-cyanopropylmethyldifluorosilane and 47.5 grams (0.177 mole) of silicon tetrabromide. The solution was heated to its boiling point (about 151° C.) but there was no gas evolution or other indication of any chemical reaction. The solution was then allowed to cool to 40° C. and one milliliter of 4-picoline was added. Upon the addition of the amine to the reactants a rapid evolution of silicon tetrafluoride gas took place, and the temperature of the reaction mixture rose to 52° C. The reaction mixture was heated at 100° C. for one hour and was then fractionally distilled under reduced pressure through a 12 inch Vigreux column. A total of 41 grams of gamma-cyanopropylmethyldibromosilane having a boiling point of 100° C. to 103° C. at 1 mm. was collected. This represents an 85 percent conversion of gamma-cyanopropylmethyldifluorosilane to gamma-cyanopropylmethyldibromosilane.

The above examples show that a convenient amount of catalyst for use in the redistribution process of this invention is between about 0.3 and about 0.6 weight percent based on the total weight of organosilicon compounds present in the reaction mixture. In Example 1, 1 gram of catalyst was used for 166 grams of organosilicon compounds, or 0.6 weight percent. Smaller or greater amounts of catalysts are operable, however, and between about 0.001 and about 10 weight percent catalyst based on total weight of organosilicon compounds is preferable. Amounts greater than 10 weight percent or less than 0.001 weight percent can be used, but without any noticeable advantage over the preferred amounts.

In many instances it is preferable to use a catalyst which has a high boiling point relative to some components of the reaction mixture. For example, if a particular fluorosilane is to be recovered from a reaction mixture by fractional distillation, it is preferable to use catalyst which has a higher boiling point than the product to be recovered. The precise choice of catalyst of course, depends upon the components of the particular reaction mixture and the particular products which may be recovered.

Phosphines have been found to be particularly useful catalysts in reactions where hydrogen chloride or other hydrogen halide may be produced, as where trace amounts of water are present in the reaction mixture. Phosphines do not form hydrochloride salts with HCl while the formation of solid amine hydrochlorides may make the separation of products in the reaction mixture more difficult.

A preferred embodiment of the redistribution process of the present invention is the use of this process in the preparation of organo-functional, chloro-, bromo-, and iodo-silanes. For example, the efficient redistribution of silicon-chlorine and silicon-fluorine bonds, which is made possible by this invention, provides a method for preparing useful organo-functional chlorosilanes in high yield by relatively uncomplicated process steps. This embodiment is described below with particular reference to chlorosilanes.

Alkyl and arylchlorosilanes are basic intermediates both for the preparation of silicone polymers such as oils, resins and elastomers as well as for the synthesis of other silanes. These materials can generally be used to advantage in this manner because many chlorosilanes are commercially available, they can be hydrolyzed fairly simply to form siloxane polymers and they enter satisfactorily into many reactions. Chlorosilanes do have certain inherent limitations, however, particularly when used as intermediates for the preparation of other silane monomers. Most of these difficulties are related to the reactivity of silicon-chlorine bonds with a wide variety of reagents. Thus, while it is desirable that chlorosilanes react rapidly and completely with water to form siloxanes it is undesirable to have reaction take place at the silicon-chlorine bond when reaction at another portion of the molecule is being sought. For example, it might be desirable to esterify a cyanoalkylchlorosilane as shown below.

(K)

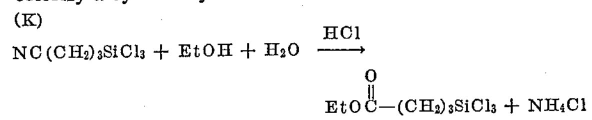

Instead, however, water present will react preferentially to hydrolyze the chlorosilane to give the corresponding polysiloxane which then may react to give the desired ester.

$$NC(CH_2)_3SiCl_3 + H_2O \rightarrow NC(CH_2)_3SiO_{3/2} + HCl$$

$$NC(CH_2)_3SiO_{3/2} + HCl + H_2O + EtOH \rightarrow EtOOC(CH_2)_3SiO_{3/2}$$

Thus, one obtains the carbethoxy derivative of a *silicone* rather than of a *chlorosilane*. Similarly, a number of other reactions of chlorosilanes with reagents proceed to give products other than those originally desired. The equations that follow all illustrate reactions taking place preferentially at the Si—Cl bond rather than the desired reaction which is shown first.

(L-1) $GSNa + Cl-(CH_2)_3SiCl_3 \longrightarrow GS-(CH_2)_3SiCl_3 + NaCl$

↘

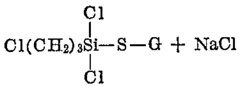

(L-2) $GNH_2 + Cl(CH_2)_3SiCl_3 \xrightarrow{+ G_3N} GNH(CH_2)_3SiCl_3 + G_3N{:}HCl$

↘

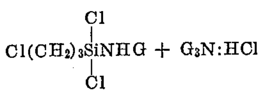

(L-3) $GONa + Cl(CH_2)_3SiCl_3 \longrightarrow GO(CH_2)_3SiCl_3 + NaCl$

↘

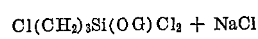

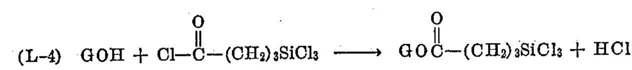

↘ mixture of $\equiv SiOG$ and $-COOG$ (L-5) $CH_2{=}CH-(CH_2)_3SiCl_3 + HCHO + HOAc + H_2SO_4 \longrightarrow HOCH_2-CH_2-CH(OH)(CH_2)_3SiCl_3$

↘ complex mixture

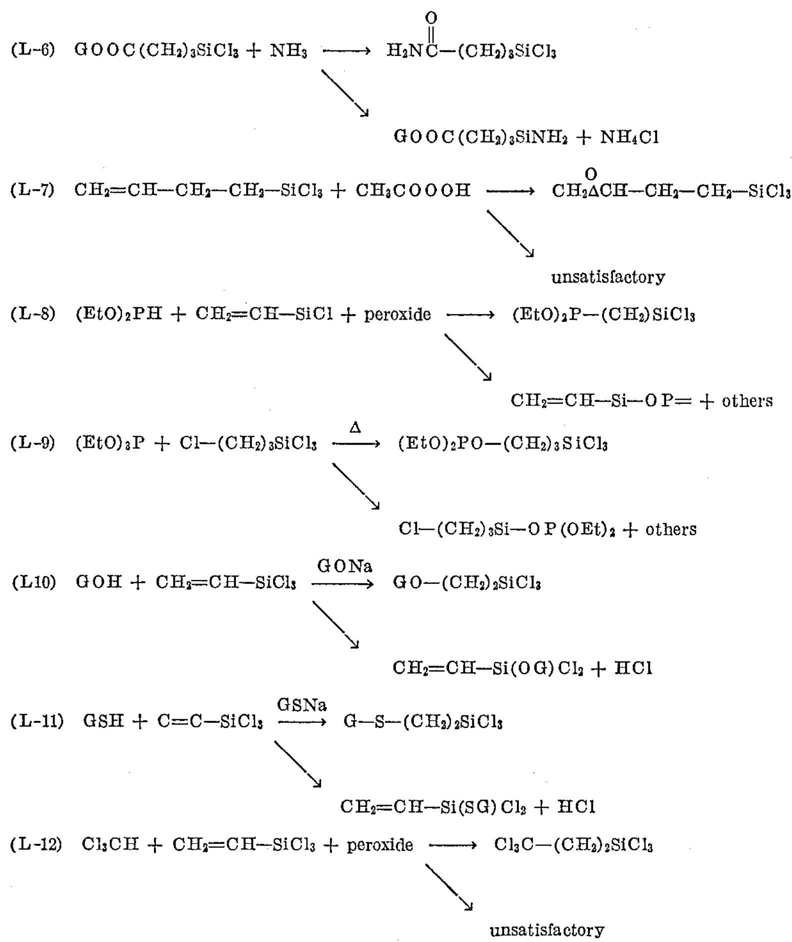

In all of these processes reaction at the silicon-chlorine bond takes place in preference to reaction in another portion of the molecule. Many other examples will be apparent to those skilled in the art.

In addition to the reactivity of chlorosilanes which causes undesirable side reactions to take place, chlorosilanes have other shortcomings as intermediates for the preparation of organo-functional chlorosilane monomers. Thus, it is well known that related di- and trifunctional chlorosilanes have boiling points that are separated by only a few degrees. In some synthetic procedures this fact makes it difficult to obtain products of high purity. This is illustrated in the examples shown below.

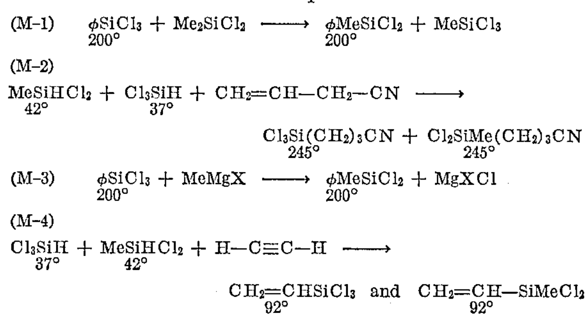

The process shown in Equation 1 is complicated by the fact that one of the reactants, $\phi SiCl_3$ and one of the products, $\phi MeSiCl_2$ are difficult to separate because their boiling points are virtually identical. In the process represented by Equation 2 it is difficult to obtain the desired product, gamma-cyanopropylmethyldichlorosilane, in the state of high purity necessary for elastomer preparation because methyldichlorosilane is usually contaminated by minor amounts of trichlorosilane whose presence results in the formation of undesirable close-boiling trifunctional impurity. The processes shown in Equations 3 and 4 illustrate similar difficulties arising from substantially identical boiling points of compounds to be separated.

Various approaches have been tried to overcome one or more of these difficulties. One is to convert the chlorosilane to the corresponding silicone thus removing the offending group. One can then carry out a number of reactions without interfering side reactions as shown in the equations that follow

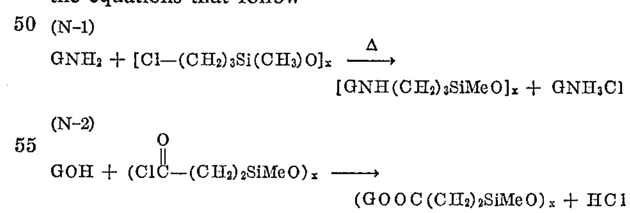

While competing side reactions are eliminated in this way certain disadvantages are still present. Because many silicones cannot be readily distilled, purification remains a problem. In addition, the reactivity of polymeric siloxanes is greatly reduced in certain cases so that satisfactory reaction does not take place. Specific instances of this are shown below.

(O–1) $(MeSiHO)_x + C{=}C{-}G \rightarrow$ poor reaction

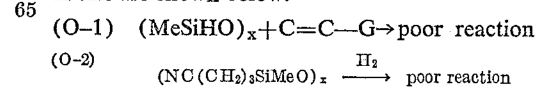

Another limitation is that it is frequently desirable for certain applications to have the silicon compounds in a monomeric rather than polymeric form.

Another approach that has been used to overcome certain disadvantages of using halosilanes is conversion to another group such as alkoxy. This method has shown some promise and is useful in certain synthetic procedures.

(P-1) $MeSiH(OEt)_2 + H_2C{=}CH{-}CH_2NH_2 \rightarrow MeSi(OEt)_2(CH_2)_3NH_2$ (P-2) $Cl(CH_2)_3Si(OEt)_3 + 2GNH_2 \rightarrow GNH(CH_2)_3Si(OEt)_3 + GNH_3Cl$ As a general approach, however, the use of alkoxysilanes in place of halosilanes has certain drawbacks. These are: (1) lowered reactivity for certain reactions such as in SiH additions to olefins; (2) for certain applications, for example the preparation of elastomers, the tendency for alkoxysilanes to hydrolyze incompletely would be undesirable; and (3) converting a halosilane to an alkoxysilane generally raises the boiling point making the purification of some monomers by distillation difficult.

Our discovery of an efficient and rapid base catalyzed redistribution process makes it possible to employ fluorosilanes as intermediates in the production of other halosilanes. By this method, many organo-functional halosilanes, particularly chlorosilanes, can be prepared efficiently and in high yield which would be difficult or impossible to prepare by known methods.

The advantages of the use of fluorosilanes as intermediates where it is desired to carry out chemical reactions on the organic portion of an organo-silicon compound are the following: (1) fluorosilanes are much less reactive than the corresponding chlorosilanes or other halosilanes and interfering side reactions are minimized; (2) it is easier to separate related di- and trifunctional fluorosilanes because of the greater spread in boiling points; (3) the lower boiling points of fluorosilanes simplifies distillation; (4) fluorosilanes can be converted to chlorosilanes or other halosilanes by a redistribution reaction. Specific examples where the above properties can be used to advantage are shown in the equations that follow.

(Q-1) $\phi SiCl_3 + HNO_3 \xrightarrow[CHCl_3]{H_2SO_4} O_2N\phi SiCl_3$ (Q-2) $\phi SiF_3 + HNO_3 \xrightarrow{H_2SO_4} O_2N\phi SiF_3$ In Equations Q, nitration of phenyltrichlorosilane results in very low yields of nitrophenyltrichlorosilane while nitration of phenyltrifluorosilane gives a quantitative yield of nitrophenyltrifluorosilane. The low yield of nitrophenyltrichlorosilane is due to hydrolysis and other side reactions. In addition, an organic solvent such as chloroform is required to reduce hydrolysis and reaction between the chlorosilane and sulfuric acid.

(R-1) $ClCH_2{-}CHCH_3{-}CH_2SiMeCl_2 + NaCN \xrightarrow{DMF} \text{polymer}$ (R-2) $ClCH_2CHCH_3CH_2SiMeF_2 + NaCN \xrightarrow[\Delta]{DMF} CN{-}CH_2{-}CHCH_3CH_2{-}SiMeF_2$ Equations R show that a chloroalkylchlorosilane cannot be made to react satisfactorily with sodium cyanide in dimethylformamide because the chlorosilane reacts preferentially with the solvent causing its decomposition. The chloroalkylfluorosilane does react satisfactorily with sodium cyanide because fluorosilanes are much less reactive with dimethylformamide.

(S) $\underset{42^\circ}{MeSiHCl_2}[\underset{37^\circ}{Cl_3SiH}] + CH_2{=}CH_2CH_2CN \longrightarrow \underset{245^\circ}{MeSiCl_2(CH_2)_3CN}[\underset{245^\circ}{Cl_3Si(CH_2)_3CN}]$ (T) $\underset{-35^\circ}{MeSiHF_2} + CH_2{=}CH{-}CH_2{-}CN \longrightarrow MeSiF_2(CH_2)_3CN$ (U-1) $ClCO(CH_2)_3SiMeCl_2 + GOH \rightarrow GOOC(CH_2)_3SiMe(OEt)_2$ (U-2) $ClCO(CH_2)_3SiMeF_2 + GOH \rightarrow GOOC{-}(CH_2)_3SiMeF_2$ (V) $\text{gamma-}NC(CH_2)_3SiMeF_2 + SiCl_4 \xrightarrow{G_3N} \text{gamma-}NC(CH_2)_3SiMeCl_2 + SiF_4 \rightarrow$ Equations S and T illustrate that the purification problems that exist in the synthesis of certain chlorosilanes are simplified when fluorosilanes are employed. The impurity $Cl_3SiH$ often present in $MeSiHCl_2$ gives an impurity product which is difficult to separate. The corresponding fluorosilane impurity, $F_3SiH$, boils at $-70^\circ$ C. and is easily removed from the $MeSiHF_2$ starting material. Equations U illustrate still another reaction where the use of a fluorosilane in place of a chlorosilane allows a desired reaction to take place. In Equation V, the ready conversion of a fluorosilane to a chlorosilane is shown.

Heretofore the possible advantages in the use of fluorosilanes as intermediates in the production of organo-functional chlorosilanes or other halosilanes were of little use because of the difficulty in converting the fluorosilanes to chlorosilanes. These disadvantages included difficulty in obtaining complete hydrolysis of fluorosilanes to siloxanes when the desired final product was an organo-functional polysiloxane. Also attempts to prepare fluorosilanes (for use as intermediates) from chlorosilanes resulted in loss of fluorine and exceedingly slow reaction thus making the conversion process exceedingly inefficient.

Thus, this invention makes it possible to (1) easily prepare fluoro-silicon compounds for use as intermediates and (2) readily reconvert a fluorosilane intermediate to a chlorosilane or other halosilane.

In a particularly preferred embodiment of this invention the fluorosilane and chlorosilane used in converting the organo-functional fluorosilane to an organo-functional chlorosilane may be so selected that a highly efficient continuous process for producing organo-functional chlorosilanes results. This preferred cyclic process is illustrated by the following examples. The Equations W, X and Y below show only the principal reaction products.

(W-1) $\phi SiCl_3 + Na_2SiF_6 \longrightarrow \phi SiF_3$ (W-2) $\phi SiF_3 + HNO_3 \xrightarrow{H_2SO_4} O_2N\phi SiF_3$ (W-3) $NO_2\phi SiF_3 + \phi SiCl_3 \xrightarrow[\text{Basic catalyst}]{} NO_2\phi SiCl_3 + \phi SiF_3$ (X-1) $CliBuSiMeCl_2 + Na_2SiF_6 \longrightarrow CliBuSiMeF_2$ (X-2) $CliBuSiMeF_2 + NaCN \xrightarrow{DMF} CNiBuSiMeF_2$ (X-3) $CNiBuSiMeF_2 + CliBuSiMeCl_2 \xrightarrow[\text{Basic catalyst}]{} CNiBuSiMeCl_2 + CliBuSiMeF$ (Y-1) $MeSiHCl_2 + \phi SiF_3 \xrightarrow[\text{Basic catalyst}]{} MeSiHF_2 + \phi SiCl_3$ (Y-2) $MeSiHF_2 + CH_2{=}CH{-}CH_2{-}CN \longrightarrow F_2Si(Me)(CH_2)_3CN$ (Y-3) $NC(CH_2)_3SiMeF_2 + MeSiHCl_2 \xrightarrow[\text{Basic catalyst}]{} NC(CH_2)_3SiMeCl_2 + MeSiHF$ As shown by the equations of these examples a chlorosilane starting material is recovered as an organo-functional chlorosilane. The fluorosilane intermediate is a reactant in Equations W-2, X-2 and Y-2 and is a product in Equations W-3, X-3 and Y-3. Thus, the fluorosilane intermediate may be continuously recycled thus conserving the fluorine in the system and eliminating the necessity of preparing large quantities of fluorosilane each time the chemical reactions such as those indicated in Equations W-2, X-2 and Y-2 above are carried out.

As is also illustrated by Examples W, X and Y above the initial batch of fluorosilane may be prepared by any convenient method. In Examples W and X the fluorosilane is prepared using an alkali metal fluorosilicate as the source of fluorine and in Example Y the redistribution process of this invention is used in the initial preparation of the fluorosilane intermediate.

Thus, the redistribution process of this invention can be employed in the preparation of organo-functional halosilanes which may be represented by the formula:

(Z) $(Y—R—)_iSiQ_{4-i}$ wherein R, Y, have the meanings defined hereinabove, Q is a halogen different from fluorine, preferably chlorine, and $i$ is an integer having a value from 1 to 3.

As a first step in producing the halosilane of Formula Z, a fluorosilane is prepared which may be represented by the formula:

(AA) $(Y—R—)_iSiF_{4-i}$ wherein Y, R and $i$ have the meanings defined hereinabove. This fluorosilane may be prepared by any convenient method and must of course have the same functionality (that is, the same number of silicon-halogen bonds) as the desired product of Formula Z.

This fluorosilane is then converted to the desired product of formula Z by the redistribution process of this invention. In this step, the compound of Formula AA is mixed with (*a*) a halosilane and with (*b*) an operable redistribution catalyst as defined hereinabove. This halosilane may be represented by the formula:

(BB) $(Z—R—)_iSiQ_{4-i}$ wherein R, Q, and $i$ have the meanings defined herein above and Z is a group different from Y. Z can be hydrogen, fluoro, chloro, bromo, iodo, cyano, $-COOG$, $-\overset{O}{\overset{\|}{C}}-G$, $-OG$, $-\overset{O}{\overset{\|}{C}}-NG_2$, $-NG_2$ or nitro, and G has the meaning defined hereinabove.

The redistribution reaction is then carried out as described hereinabove and is driven to completion by removing the fluorosilane reaction product having the formula:

(CC) $(Z—R—)_iSiF_{4-i}$ wherein Z, R and $i$ have the meanings defined hereinabove. The desired organo-functional halosilane of Formula Z can then be recovered in high yield from the resulting reaction mixture.

In the preferred continuous process for producing an organo-functional chlorosilane of Formula Z, the first step involves converting a fluorosilane of Formula CC to a fluorosilane of Formula AA by appropriate chemical reactions. These chemical reactions depend upon the nature of the Y and Z groups in the compounds of Formulas AA and CC and the choice of reactions and reaction conditions can be easily made by one skilled in the chemistry of organo-silicon compounds. Several such conversions are detailed in the illustrative examples which follow. The fluorosilane of Formula CC may be prepared initially by any convenient method. The fluorosilane of Formula AA is then mixed with a chlorosilane of Formula BB and the redistribution reaction driven to completion as described in the two next preceding paragraphs. The compound of Formula CC which is removed in driving the reaction to completion can be recycled and used in preparing the fluorosilane of Formula AA. In this preferred continuous process, the compounds of Formulas AA, BB and CC all have the same functionality.

The following additional examples illustrate the use of the redistribution process of this invention in the preparation of organo-functional halosilanes, including the preferred cyclic process for producing chlorosilanes.

EXAMPLE 12

*Redistribution of Nitrophenylmethyldifluorosilane With Phenylmethyldichlorosilane*

*Preparation of phenylmethyldifluorosilane.*—The following were placed in a flask equipped with stirring mechanism, thermometer and means for fractionally distilling the reaction products: 1141 grams (6.0 moles) of phenylmethyldichlorosilane, 1504 grams (8.0 moles) of $Na_2SiF_6$ and 750 milliliters of tetrahydronaphthalene. The reaction mixture was heated at its boiling point with stirring under an inert atmosphere of nitrogen. Crude phenylmethyldifluorosilane was removed by fractional distillation over a 3 hour period. The crude product was redistilled to yield 802 grams of pure phenylmethyldifluorosilane having a boiling point of 143° to 144.5° C.

*Nitration of phenylmethyldifluorosilane.*—The following were placed in a flask fitted with stirring mechanism, thermometer and dropping funnel for introducing the acid reactants: 474.5 grams (3.0 moles) of phenylmethyldifluorosilane and 1 liter of chloroform. In the dropping funnel was placed a mixture of 315 grams (4.5 moles) of 90 percent fuming nitric acid and 700 grams of concentrated sulfuric acid. The mixed acids were added to the flask over a period of 20 to 40 minutes while the temperature of the reaction mixture was maintained between 15° C. and 30° C. by means of an ice bath. After the addition of acid was complete the reaction mixture was stirred for 30 minutes at temperatures below 30° C. The final reaction mixture consisted of an acid layer and an organic layer which were separated in a separatory funnel. The acid layer was discarded. Chloroform was removed from the organic layer under reduced pressure and the residue was fractionally distilled under reduced pressure to yield nitrophenylmethyldifluorosilane having a boiling point of 75° C. at a pressure of 0.4 millimeter of mercury.

*Redistribution reaction.*—The following were placed in a 2 liter flask fitted with means for fractionally distilling the reaction products: 448 grams (2.2 moles) of nitrophenylmethyldifluorosilane, 630 grams (3.3 moles) of phenylmethyldichlorosilane and 4.5 grams of tri-n-butylamine. The reaction mixture was heated at its boiling point and relatively low boiling products were fractionally distilled at atmospheric pressure. The reaction products were further fractionally distilled at reduced pressure and 261 grams of nitrophenylmethyldichlorosilane having a boiling point of 85° C. to 95° C. over a pressure range of 0.2 to 0.5 millimeter of mercury were recovered.

EXAMPLE 13

*Redistribution of Nitrophenyltrifluorosilane With Phenyltrichlorosilane*

*Preparation of phenyltrifluorosilane.* The following were placed in a 5 liter flask equipped with stirrer, thermometer and means for fractionally distilling the reaction products: 750 milliliters of tetrahydronaphthalene solvent, 2260 grams (12.0 moles) of $Na_2SiF_6$ and 1270 grams (6.0 moles) of phenyltrichlorosilane. The reaction mixture was stirred and heated at its boiling point under an inert atmosphere. Crude phenyltrifluorosilane having a boiling point of 90° C. to 110° C. was removed from the reaction mixture by fractional distillation over a 3 hour period. The crude product was redistilled to give 860 grams of pure phenyltrifluorosilane having a boiling point of 101° C. to 103° C.

*Nitration of phenyltrifluorosilane.*—Following the procedure described in detail in the second paragraph of Example 12, phenyltrifluorosilane was nitrated to produce nitrophenyltrifluorosilane having a boiling point of 56° C. at a pressure of 1.7 millimeters of mercury.

*Redistribution reaction.*—The following were placed in a 1 liter flask fitted with means for fractionally distilling reaction products: 460 grams (2.2 moles) of nitrophenyltrifluorosilane, 700 grams (3.3 moles) of phenyltrichlorosilane and 5 grams of tri-n-butylamine. The reaction mixture was heated at its boiling point and a fraction comprising mainly phenyl-, mixed chloro- and fluorosilanes and having a boiling point of 103° C. to 130° C. at atmospheric pressure was collected over a period of about one hour. The reaction products were further fractionally distilled at reduced pressure and 348 grams of nitrophenyltrichlorosilane having a boiling point of 98° C. to 128° C. in the pressure range of 0.2 to 1.7 millimeters of mercury were recovered. This represents about an 80 percent conversion of nitrophenyltrifluorosilane to nitrophenyltrichlorosilane.

By a careful fractional distillation of the relatively low boiling reaction products phenyltrifluorosilane can be recovered and recycled for use in the nitration step described in the second paragraph of this example.

EXAMPLE 14

*Redistribution of Bis(Nitrophenyl)Difluorosilane With Bis(Phenyl)Dibromosilane*

Following the procedures detailed in Example 13, bis-(phenyl)dibromosilane is reacted with $Na_2SiF_6$ to produce bis(phenyl)difluorosilane which is thereafter nitrated to yield bis(nitrophenyl)difluorosilane. A mixture of bis(nitrophenyl)-difluorosilane, bis(phenyl)dibromosilane, and tri-n-hexylamine catalyst is then heated and fractionally distilled to produce bis(nitrophenyl)dibromosilane and bis(phenyl)difluorosilane. The latter compound can be recycled and nitrated to yield additional bis(nitrophenyl)difluorosilane for use in the redistribution step.

EXAMPLE 15

*Redistribution of Gamma-Cyanoisobutylmethyldifluorosilane With Gamma-Chloroisobutylmethyldichlorosilane*

*Preparation of gamma-chlorisobutylmethyldifluorosilane.*—The following were placed in a reaction flask fitted with stirring means, thermometer and means for fractionally distilling the products: 383 grams (2.0 moles) of gammachlorosiobutylmethyldichlorosilane, 500 grams (2.7 moles) of $Na_2SiF_6$ and 350 milliliters of tetrahydronaphthalene. The reaction mixture was heated at its boiling point and crude product was recovered by fractional distillation over a 3 hour period. The crude product was redistilled to yield pure gamma-chlorisobutyldifluorosilane having a boiling point of 143° C. to 144° C.

*Preparation of gamma-cyanoisobutylmethyldifluorosilane.*—The following were placed in a reaction flask fitted with stirring means, thermometer and means for fractionally distilling the reaction products: 75 grams (1.5 moles) of sodium cyanide, 2 grams of potassium iodide and 200 milliliters of dimethylformamide. This mixture was heated at its boiling point to drive off any water present. The mixture was then cooled and 180 grams (1.04 moles) of gamma-chloroisobutylmethyldifluorosilane was added. This mixture was then heated to its boiling point for 2 hours. After cooling to 35° C., 150 milliliters of anhydrous diethyl ether was added and the entire mixture was filtered. The filtered mixture was then fractionally distilled to give a crude product boiling in the range from 33° C. at 4.0 millimeters pressure to 50° C. at 1.3 millimeters pressure. The crude product was redistilled at atmospheric pressure to yield 82 grams of pure gamma-cyanoisobutylmethyldifluorosilane having a boiling point of 199.5° C. 200° C. at 750 millimeters pressure.

*Redistribution reaction.*—The following were placed in a 500 milliliter flask fitted with means for fractionally distilling the products: 80 grams (0.49 mole) of gamma-cyanoisobutylmethyldifluorosilane, 155 grams (0.74 mole) of gamma-chloroisobutylmethyldichlorosilane and 1.6 grams of tri-n-butylamine. The reaction mixture was then heated to its boiling point and the products fractionally distilled to yield pure gamma-cyanoisobutylmethyldichlorosilane having a boiling point of 63° C. at 0.3 millimeter pressure. The gamma-chloroisobutylmethyldifluorosilane produced in the redistribution reaction can be recycled and used to produce additional quantities of gamma-cyanoisobutylmethyldifluorosilane as described in the second paragraph of this example.

EXAMPLE 16

*Redistribution of Gamma-Cyanopropylmethyldifluorosilane With Methyldichlorosilane*

*Addition of methyldifluorosilane to allyl cyanide.*—The following were placed in a 200 milliliter pressure vessel: 83 grams (1.24 moles) of allyl cyanide, 55 grams of methyldifluorosilane and 0.00003 mole of $H_2PtCl_6$ in 1 milliliter of ethanol. The pressure vessel was sealed and heated at 160° C. with shaking for 3 hours. The reaction products were separated by fractional distillation and 88 grams of crude product were obtained. The crude material was redistilled at atmospheric pressure to produce gamma-cyanopropylmethyldifluorosilane having a boiling point of 195.3° C.

*Redistribution reaction.*—Following the procedures of Example 15, a mixture of methyldichlorosilane, gamma-cyanopropylmethyldifluorosilane and tri-n-butylamine catalyst are heated and fractionally distilled to yield methyldifluorosilane and gamma-cyanopropylmethyldichlorosilane. The methyldifluorosilane produced in the redistribution reaction can be recycled and used in the production of the fluorosilane intermediate as described in the first paragraph of this example.

In another preferred embodiment of the present invention the base catalyzed silicon-halogen bond redistribution process of this invention can be used in the purification of chlorosilane mixtures, bromosilane mixtures, or iodosilane mixtures.

For example, it is frequently difficult to obtain chlorosilanes in high purity because related higher functional chlorosilanes have boiling points separated by only a few degrees. For example, $Me_2SiCl_2$, B.P.=70° C.; $MeSiCl_3$, B.P.=66° C. and $\phi SiCl_3$, B.P.=201° C.; $\phi MeSiCl_2$, B.P.=204° C. This problem is of particular importance in the preparation of elastomers where the presence of very small quantities of trifunctional impurities is undesirable. Functionality is, as stated hereinabove, defined in terms of the number of silicon-halogen bonds in the organo-silicon compound.

By way of illustration, a number of methods have been heretofore disclosed for purifying chlorosilanes. These methods involve conversion of the chlorosilane to the corresponding esters which are then separated by distillation, by selective reaction of higher functional impurities with limited amounts of water and by removal of certain impurities such as silicon tetrachloride or trichlorosilane by complex formation with tertiary amines.

A procedure has now been discovered for the purification of halosilanes which employs fluorosilanes as intermediates and which makes use of the redistribution reaction of the present invention. By this procedure, halosilanes are purified by the selective removal of higher functional halosilanes as fluorosilanes.

According to the improved purification process of the present invention a halosilane admixed with halosilane impurities of higher functionality can be purified by adding to the mixture a fluorine-containing compound and a suitable basic catalyst as hereinbefore described. Silicon-fluorine bonds are formed and a redistribution of the silicon-fluorine and other silicon-halogen bonds takes place. The most volatile of the resulting fluoro-silicon compounds are then removed from the system. The most volatile fluoro-silicon compound is formed from the halosilane having the highest functionality. Thus, by adding to the halosilane mixture sufficent fluorine-containing compound to provide at least one mole of available fluorine per mole of silicon-halogen bonds in the higher functional halosilane impurities these impurities can be completely removed from the system. The desired halosilane can be readily obtained from the resulting reaction mixture in high purity by distillation.

For example, an initial chlorosilane mixture may consist of trimethylchlorosilane (boiling point 57° C.) as the main component and silicon tetrachloride (boiling point 58° C.) as an impurity. To this system can be added phenyltrifluorosilane (boiling point 102° C.) in a ratio of about 1.33 moles of phenyltrifluorosilane per mole of silicon tetrachloride impurity and a catalytic amount of tri-n-butylamine. By heating and distilling the resulting reaction mixture silicon tetrafluoride gas is removed and the resulting reaction mixture contains trimethylchlorosilane and phenyltrichlorosilane (boiling point 201° C.), the latter compound being derived from the phenyltrifluorosilane originally added. The trimethylchlorosilane can then be easily recovered by fractional distillation in highly purified form.

The halosilanes which can be purified by the process of the present invention may be represented by the formula:

(DD) $$(Y-R-)_g\overset{R'_h}{\overset{|}{Si}}Q_{4-g-h}$$

wherein R, Y, G (included in the definition of Y), Q and R′ have the meanings defined hereinabove with reference to Formulas B and Z, $g$ is an integer having a value from 1 to 3, $h$ is an integer having a value from 0 to 1, and the sum of $g$ and $h$ is never greater than 3.

The higher functional halosilane impurities may be represented by the formula:

(EE) $$(Y-R-)_t\overset{R'_u}{\overset{|}{Si}}Q_{4-t-u}$$

wherein R, Y, G (included in the definition of Y), Q and R′ have the meanings defined hereinabove with reference to Formulas B and Z, $t$ is an integer having a value from 0 to 2, $u$ is an integer having a value from 0 to 1 and the sum of $t$ and $u$ is never greater than 2. That is, the compounds to be purified (Formula DD) can be mono-, di- or trifunctional halosilanes, while the impurities of Formula EE can be di-, tri-, or tetrafunctional halosilanes.

Examples of the chlorosilanes which can be purified by this process include all those which can undergo the chlorosilane-fluorosilane redistribution reaction as discussed hereinabove. Generally, this process may be employed to purify a chlorosilane which is contaminated by one or more higher functional, close boiling impurities. In the examples of systems that follow which may be purified by this process, the main component is listed first, followed by the impurity or undesired component. These systems include by way of exemplification and not limitation dimethyldichlorosilane-methyltrichlorosilane;
phenylmethyldichlorosilane-phenyltrichlorosilane;
diphenyldichlorosilane-bis-trichlorosilylbenzene;
vinylmethyldichlorosilane-vinyl-trichlorosilane;
diethyldichlorosilane-ethyltrichlorosilane;
methyldichlorosilane-trichlorosilane;
trimethylchlorosilane-silicon tetrachloride;
gamma-cyanopropylmethyldichlorosilane-gamma-cyanopropyltrichlorosilane;
diphenylmethylchlorosilane-diphenyldichlorosilane;
gamma-chloroisobutylmethyldichlorosilane-gamma-chloroisobutyltrichlorosilane;
bis-dichloromethylsilylbenzene-bis-trichlorosilylbenzene;
bis-dimethylchlorosilylethylene-bis-dichloromethylsilylethylene and the like.

Similar mixtures of bromosilanes or iodosilanes can also be purified by the above described purification process.

The sources of fluorine which can be employed are alkali metal flurorosilicates, such as, $Na_2SiF_6$ and $K_2SiF_6$, metal fluorides such as, silver fluoride, cobalt fluoride, boron fluoride, hydrogen fluoride, antimony fluoride, calcium fluoride, sodium fluoride and the like and fluorosilanes having higher boiling points than the halosilanes in the mixture. These compounds react with the compounds in the mixture to be purified, with the formation of silicon-fluorine bonds, in the preferred temperature range from about −20° C. to about 200° C. Higher temperatures can also be employed but without any substantial increase in yield or rate of reaction.

The use of alkali metal fluorosilicates and metal fluorides to introduce silicon-fluorine bonds into the system does not have the disadvantages discussed hereinabove with reference to using these materials in preparing fluorosilanes. In the purification process, only a relatively small percentage of the silicon-chlorine bonds are converted to silicon-fluorine bonds by this process, and only relatively small amounts of solid materials are introduced into the system.

It is preferable to use an excess of fluorine containing compound over the amount required to furnish one mole of available fluorine per mole of silicon-halogen bonds in the mixture. The magnitude of the excess is not critical, but an excess varying from 5 to 10 percent of the mole for mole amount when the halosilane impurity content is in the order of 8 to 10 weight percent of the halosilane mixture to 200 percent of the mole for mole amount when the impurity content is less than one percent has been found most preferable.

In a preferred form of the purification process of this invention the source of fluorine is a fluorosilane represented by the formula:

(FF) $$(Z-R-)_t\overset{R''_u}{\overset{|}{Si}}_{4-t-u}$$

wherein R has the meaning defined with reference to Formula B hereinabove, Z has the meaning defined with reference to Formula BB hereinabove, R″ is selected from the class consisting of hydrogen, the vinyl group and Z—R— groups, and $t$ and $u$ have the meanings defined with reference to Formula EE hereinabove. Such fluorosilanes must, of course, have higher boiling points than any of the halosilanes in the reaction mixture to be purified.

The operable redistribution catalysts are the tertiary amine, tri(monovalent hydrocarbon group) phosphines and silylamines described in detail hereinabove. The amount of catalyst, reaction temperatures and times are also the same as those discussed hereinabove with reference to the general base catalyzed redistribution reaction of this invention.

In carrying out the halosilane purification process of this invention, the impure mixture (whose major component is a halosilane of Formula DD and whose minor components are higher functional halosilanes of Formula EE) is combined with a source of fluorine and a basic catalyst. The combined mixture is then heated to a temperature sufficiently elevated to cause the redistribution reaction to take place, preferably a temperature between about −20° C. and about 200° C. When the source of fluorine is an alkali metal fluorosilicate or a metal fluoride, these compounds first of all react with silicon-halogen bonds present in the mixture to form silicon-fluorine bonds. Redistribution then takes place between the silicon-fluorine and other silicon-halogen bonds. The most volatile compounds in the redistributed mixture are the fluorosilanes corresponding to the higher functional halosilane impurities, that is, fluorosilanes represented by the formula:

(GG) $$(Y-R-)_t\overset{R'_u}{\overset{|}{Si}}F_{4-t-u}$$

wherein Y, R, R′, $t$ and $u$ have the meanings defined with reference to Formula EE hereinabove. The redistribution reaction is driven to completion by removing the fluorosilanes of Formula GG from the reaction mixture and the halosilane of Formula DD is then recovered from the resulting reaction mixture.

When the source of fluorine is an alkali metal fluorosilicate or metal fluoride the resulting reaction mixture typically contains the halosilane of Formula DD, the catalyst and solid residues, all of which are readily separable. When the source of fluorine is a fluorosilane, the resulting reaction mixture typically contains the halosilane of Formula DD, the catalyst, and relatively high boiling halosilanes derived from the fluorosilane. Again a separation is readily carried out.

Selecting a fluorosilane having a higher boiling point than the halosilanes in the original mixtures is necessary in order that the halosilane derived from it as a result of the redistribution reaction will boil appreciably higher than the halosilane to be purified.

The following examples are illustrative of the embodiment of the present invention wherein the novel base catalyzed silicon-halogen bond redistribution process is used in the purification of halosilane mixtures.

EXAMPLE 17

The following were placed in a 500 milliliter flask fitted with means for fractionally distilling the reaction products: 102 grams (0.404 mole) diphenyldichlorosilane, 11 grams (0.03 mole) bis(trichlorosilyl)benzene, 21 grams (0.11 grams) $Na_2SiF_6$ and 0.5 gram tri-n-heptylamine. The reaction mixture was heated at its boiling point and fractionally distilled. The first fraction boiling at 125° C. at atmospheric pressure was identified as bis(trifluorosilyl)benzene. This represented almost complete removal of the bis(trichlorosilyl)benzene impurity from the reaction mixture.

EXAMPLE 18

The following were placed in a 500 milliliter flask fitted wtih means for fractionally distilling the reaction products: 103 grams (0.95 mole) of trimethylchlorosilane, 14.3 grams (0.084 mole) of silicon tetrachloride, 25 grams (0.154 mole) of phenyltrifluorosilane and 1 gram of tri-n-heptylamine. An immediate evolution of gas, principally silicon tetrafluoride, took place. After the gas evolution had subsided the reaction mixture was fractionally distilled at atmospheric pressure. The last traces of fluorosilane (trimethylfluorosilane) were removed in a fraction boiling at 54° C. to 57° C. Purification of the remaining reaction mixture by fractional distillation was continued and 70 grams of purified product boiling at 57.0° C. to 57.5° C. was recovered. The purified product was analyzed and was found to consist of trimethylchlorosilane containing less than 0.1 percent silicon tetrachloride impurity.

EXAMPLE 19

The following were placed in a 1 liter flask fitted with means for fractionally distilling the reaction mixture: 99 grams (0.47 mole) of phenyltrichlorosilane, 406 grams (2.12 moles) of phenylmethyldichlorosilane, 167 grams (0.89 mole) of sodium fluorosilicate and 1.5 grams of N,N-diethylaniline. The reaction mixture was heated at its boiling point and silicon tetrafluoride gas was evolved. Gas evolution subsided after about 2 hours and the remaining reaction products were fractionally distilled at atmospheric pressure. About 85 percent of the phenyltrichlorosilane originally present in the chlorosilane mixture was removed as phenyltrifluorosilane.

EXAMPLE 20

The following were placed in a 1 liter flask fitted with means for fractionally distilling the products: 500 grams (2.75 moles) of gamma-cyanopropylmethyldichlorosilane, 12.5 grams (0.062 mole) of gamma-cyanopropyltrichlorosilane, 26 grams (0.138 mole) of sodium fluorosilicate and 0.5 gram of 2,2'-dipyridyl. The reaction mixture was heated at its boiling point and silicon tetrafluoride gas was evolved. At this point an additional 25 grams (0.035 mole) of sodium fluorosilicate and 0.5 gram of 2,2'-biquinolyl was added and the reaction mixture again heated at its boiling point to drive off additional quantities of silicon tetrafluoride. The resulting reaction mixture was fractionally distilled at atmospheric pressure. A fraction boiling at 242° C. was identified as substantially impurity-free gamma-cyanopropylmethyldichlorosilane.

The purified gamma-cyanopropylmethyldichlorosilane was used to prepare a gamma-cyanopropylmethylsilicone-modified dimethyl silicone elastomer. The properties of the cured elastomer indicated that the gamma-cyanopropylmethyldichlorosilane used in its preparation was substantially free from trifunctional impurities.

EXAMPLE 21

The following were placed in a 1 liter flask fitted with means for fractionally distilling the reaction mixture: 500 grams of methyldichlorosilane, 59 grams of trichlorosilane, 162 grams of phenyltrifluorosilane, 1 gram of tri-n-butylamine and 1 gram of N,N-diethylaniline. The reaction mixture was chilled to 2° C. to 5° C. and maintained at this temperature for about 3 hours during which time gaseous fluorosilanes were evolved. The reaction mixture was then warmed to 20° C. over a half-hour period. The reaction mixture was then fractionally distilled at atmospheric pressure. The product fraction having a boiling point of 40.5° C. to 40.8° C. was identified as methyldichlorosilane containing only 0.11 percent of trichlorosilane.

EXAMPLE 22

The following were placed in a 500 milliliter flask fitted with means for fractionally distilling the products: 200 grams of vinylmethyldichlorosilane, 12 grams of vinyltrichlorosilane, 48 grams of phenyltrifluorosilane and 2 grams of N,N-diethylaniline. Some methyltrichlorosilane impurity was also present. The reaction mixture was maintained at room temperature overnight during which time a slow evolution of gas, principally vinyltrifluorosilane, took place. The reaction mixture was then heated at its boiling point and fractionally distilled at atmospheric pressure. Purified vinylmethyldichlorosilane having a boiling point of 92.8° C. was recovered. A sample of the purified material was analyzed for impurity content and compared with the impurity content of the mixture with the following results:

| Sample | Original Mixture | Purified Sample |
|---|---|---|
| $MeViSiCl_2$ (percent) | 94.9 | 100. |
| $ViSiCl_3$ (percent) | 4.9 | Not detected (less than 0.1). |
| $MeSiCl_3$ (percent) | 0.24 | Not detected (less than 0.1). |

EXAMPLE 23

The following were placed in a 1 liter flask fitted with means for fractionally distilling the products: 436 grams of dimethyldichlorosilane, 4.4 grams of methyltrichlorosilane, 22 grams of phenyltrifluorosilane and 4.5 grams of N,N-diethylaniline. The reaction mixture was heated at its boiling point and low boiling fluorosilanes were removed. The remaining chlorosilanes were then fractionally distilled at atmospheric pressure. The purified dimethyldichlorosilane contained about only 0.1 percent of trifunctional impurity while the impure mixture contained about 0.97 percent methyltrichlorosilane. The low boiling fluorosilanes removed consisted primarily of methyltrifluorosilane.

EXAMPLE 24

Following the procedures of Example 23, dimethyldibromosilane containing three weight percent methyltribromosilane is purified by adding phenyltrifluorosilane and N,N-diethylaniline, heating the resulting mixture, and recovering the dimethyldibromosilane containing less than one weight percent methyltribromosilane by fractional distillation.

What is claimed is:

1. A process for the redistribution of silicon-halogen bonds in organo-silicon compounds which comprises forming a reactive mixture consisting of (1) at least one organo-silicon compound selected from the class consisting of (*a*) silanes represented by the formula:

$$(Y—R—)_e\overset{R'_f}{\underset{|}{Si}}X_{4-e-f}$$

wherein R is a divalent hydrocarbon group, Y is a group selected from the class consisting of hydrogen, fluoro, chloro, bromo, iodo, cyano, $$—COOG,\quad —NG_2,\quad \overset{O}{\overset{\|}{—C—G}},\quad —OG,\quad \overset{O}{\overset{\|}{—C—NG_2}}$$

and nitro, G is a monovalent hydrocarbon group, R' is selected from the class consisting of hydrogen, the vinyl group, and Y—R— groups, X is a halogen, *e* is an integer having a value from 0 to 3, *f* is an integer having a value from 0 to 1 and the sum of *e* and *f* is never greater than 3. (*b*) linear polysiloxanes represented by the formula:

$$X—\left[\begin{array}{c} R—Y \\ | \\ Si—O \\ | \\ R—Y \end{array}\right]_y \begin{array}{c} R—Y \\ | \\ —Si—X \\ | \\ R—Y \end{array}$$

wherein R, Y and X have the meanings defined hereinabove and *y* is an integer having a value from 1 to 10,000, and (*c*) cyclic polysiloxanes represented by the formula:

$$\left[\begin{array}{c} X \\ | \\ —Si—O \\ | \\ R—Y \end{array}\right]_r \left[\begin{array}{c} R—Y \\ | \\ —Si—O \\ | \\ R—Y \end{array}\right]_s$$

wherein R, Y and X have the meanings defined hereinabove, *r* is an integer having a value from 1 to 3, and *s* is an integer having a value from 2 to 10, and (2) a basic catalyst selected from the class consisting of tertiary amines wherein all three normal valencies of the nitrogen atoms are bonded to carbon atoms of hydrocarbon moieties, tri(monovalent hydrocarbon group) phosphines, and silylamines represented by the formula:

$$G_mSi(NG_2)_{4-m}$$

wherein G has the meaning defined hereinabove, and *m* is an integer having the value of zero to 3, there being present in said reactive mixture at least one silicon-fluorine bond and at least one other different silicon-halogen bond, and heating said mixture to a temperature sufficiently elevated to cause said redistribution to take place.

2. A process for the redistribution of silicon-halogen bonds in organo-silicon compounds which comprises forming a reactive mixture consisting of (1) at least one organo-silicon compound selected from the class consisting of (*a*) silanes represented by the formula:

$$(Y—R—)_e\overset{R'_f}{\underset{|}{Si}}X_{4-e-f}$$

wherein R is a divalent hydrocarbon group, Y is a group selected from the class consisting of hydrogen, fluoro, chloro, bromo, iodo, cyano, $$—COOG,\quad —NG_2,\quad \overset{O}{\overset{\|}{—C—G}},\quad —OG,\quad \overset{O}{\overset{\|}{—C—NG_2}}$$

and nitro, G is a monovalent hydrocarbon group, R' is selected from the class consisting of hydrogen, the vinyl group, and Y—R— groups, X is selected from the class consisting of fluorine and chlorine, *e* is an integer having a value from 0 to 3, *f* is an integer having a value from 0 to 1 and the sum of *e* and *f* is never greater than 3, (*b*) linear polysiloxanes represented by the formula:

$$X—\left[\begin{array}{c} R—Y \\ | \\ Si—O \\ | \\ R—Y \end{array}\right]_y \begin{array}{c} R—Y \\ | \\ —Si—X \\ | \\ R—Y \end{array}$$

wherein R, Y and X have the meanings defined hereinabove and *y* is an integer having a value from 1 to 10,000, and (*c*) cyclic polysiloxanes represented by the formula:

$$\left[\begin{array}{c} X \\ | \\ —Si—O \\ | \\ R—Y \end{array}\right]_r \left[\begin{array}{c} R—Y \\ | \\ —Si—O \\ | \\ R—Y \end{array}\right]_s$$

wherein R, Y and X have the meanings defined hereinabove, *r* is an integer having a value from 1 to 3, and *s* is an integer having a value from 2 to 10, and (2) a basic catalyst selected from the class consisting of tertiary amines wherein all three normal valencies of the nitrogen atoms are bonded to carbon atoms of hydrocarbon moieties, tri(monovalent hydrocarbon group) phosphines, and silylamines represented by the formula:

$$G_mSi(NG_2)_{4-m}$$

wherein G has the meaning defined hereinabove, and *m* is an integer having the value of zero to 3, there being present in said reactive mixture at least one silicon-chlorine bond and at least one silicon-fluorine bond, and heating said mixture to a temperature sufficiently elevated to cause said redistribution to take place.

3. A process for the redistribution of silicon-halogen bonds in organo-silicon compounds which comprises forming a reactive mixture consisting of (1) at least one organo-silicon compound represented by the formula:

$$(Y—R—)_e\overset{R'_f}{\underset{|}{Si}}X_{4-3-f}$$

wherein R is a divalent hydrocarbon group containing from 1 to 17 carbon atoms, Y is a group selected from the class consisting of hydrogen, fluoro, chloro, bromo, iodo, cyano, $$—COOG,\quad —NG_2,\quad \overset{O}{\overset{\|}{—C—G}},\quad —OG,\quad \overset{O}{\overset{\|}{—C—NG_2}}$$

and nitro, G is a monovalent hydrocarbon group containing from 1 to 10 carbon atoms, R' is selected from the class consisting of hydrogen, the vinyl group, and Y—R— groups, X is selected from the class consisting of fluorine and chlorine, *e* is an integer having a value of from 0 to 3, *f* is an integer having a value from 0 to 1 and the sum of *e* and *f* is never greater than 3, and (2) a tertiary amine catalyst, all three normal valencies of the nitrogen atoms in said amine being bonded to carbon atoms of hydrocarbon moieties, there being present in said reactive mixture at least one silicon-chlorine bond and at least one silicon fluorine bond, and heating said mixture to a temperature between about −20° C. and about 200° C. to cause said redistribution to take place.

4. A process in accordance with claim 3 wherein said redistribution reaction is carried out in an inert organic solvent.

5. A process in accordance with claim 3 wherein said tertiary amine catalyst is selected from the group consisting of tri-n-butylamine, tri-n-hexylamine, tri-n-heptylamine, N,N-diethylaniline and 2,2'-dipyridyl.

6. The process which comprises forming a reactive mixture of nitrophenylmethyldifluorosilane, silicon tetrachloride and tri-n-heptylamine, and heating said mixture to a temperature between about −20° C. and about 200° C. to cause redistribution of the silicon-fluorine and silicon-chlorine bonds in said mixture.

7. The process which comprises forming a reactive mixture of phenylmethyldifluorosilane, trimethylchlorosilane and tri-n-hexylamine, and heating said mixture to a temperature between about −20° C. and about 200° C. to cause redistribution of the silicon-fluorine and silicon-chlorine bonds in said mixture.

8. The process which comprises forming a reactive mixture of phenylmethyldifluorosilane, silicon tetrabromide and phenyldiethylphosphine, and heating said mixture to a temperature between about −20° C. and about 200° C. to cause redistribution of the silicon-fluorine and silicon-bromine bonds in said mixture.

9. A process for producing an organo-functional halosilane represented by the formula:

(I) $$(Y—R—)_iSiQ_{4-i}$$

wherein R is a divalent hydrocarbon group, Y is a group selected from the class consisting of hydrogen, fluoro, chloro, bromo, iodo, cyano, $$-COOG-,\quad -NG_2,\quad -\overset{O}{\overset{\|}{C}}-G,\quad -OG,\quad -\overset{O}{\overset{\|}{C}}-NG_2$$

and nitro, G is a monovalent hydrocarbon group, Q is selected from the class consisting of chlorine, bromine and iodine, and $i$ is an integer having a value from 1 to 3 which process comprises (1) forming a reactive mixture of (*a*) a fluorosilane represented by the formula:

(II) $(Y—R—)_iSiF_{4-i}$ wherein R, Y and $i$ have the meanings defined hereinabove and wherein the functionality of the compound of Formula II is the same as the functionality of the desired product of Formula I, (*b*) a halosilane represented by the formula:

(III) $(Z—R—)_iSiQ_{4-i}$ wherein R, Q and $i$ have the meanings defined hereinabove and Z is different from the Y group of the compound of Formula I and is selected from the class consisting of hydrogen, fluoro, chloro, bromo, iodo, cyano, $$-COOG-,\quad -NG_2,\quad -\overset{O}{\overset{\|}{C}}-G,\quad -OG,\quad -\overset{O}{\overset{\|}{C}}-NG_2$$

and nitro, and with (*c*) a basic catalyst selected from the class consisting of tertiary amines wherein all three normal valencies of the nitrogen atoms are bonded to carbon atoms of hydrocarbon moieties, tri(monovalent hydrocarbon group) phosphines and silylamines represented by the formula:

$$G_mSi(NG_2)_{4-m}$$

wherein G has the meaning defined hereinabove, and $m$ is an integer having the value of zero to 3, (2) heating said mixture to a temperature sufficiently elevated to cause redistribution of the silicon-fluorine and other silicon-halogen bonds in said compounds of Formulas II and III, (3) removing from said mixture a fluorosilane represented by the formula:

(IV) $(Z—R—)_iSiF_{4-i}$ wherein R, Z and $i$ have the meanings defined hereinabove, and (4) thereafter recovering from the resulting reaction mixture the product of Formula I.

10. A process for producing an organo-functional chlorosilane represented by the formula:

(I) $(Y—R—)_iSiCl_{4-i}$ wherein R is a divalent hydrocarbon group, Y is a group selected from the class consisting of hydrogen, fluoro, chloro, bromo, iodo, cyano, $$-COOG-,\quad -NG_2,\quad -\overset{O}{\overset{\|}{C}}-G,\quad -OG,\quad -\overset{O}{\overset{\|}{C}}-NG_2$$

and nitro, G is a monovalent hydrocarbon group and $i$ is an integer having a value from 1 to 3 which process comprises (1) forming a reactive mixture of (*a*) a fluorosilane represented by the formula:

(II) $(Y—R—)_iSiF_{4-i}$ wherein R, Y and $i$ have the meanings defined hereinabove and wherein the functionality of the compound of Formula II is the same as the functionality of the desired product of Formula I, (*b*) a chlorosilane represented by the formula:

(III) $(Z—R—)_iSiCl_{4-i}$ wherein R and $i$ have the meanings defined hereinabove and Z is different from the Y group of the compound of Formula I and is selected from the class consisting of hydrogen, fluoro, chloro, bromo, iodo, cyano, $$-COOG-,\quad -NG_2,\quad -\overset{O}{\overset{\|}{C}}-G,\quad -OG,\quad -\overset{O}{\overset{\|}{C}}-NG_2$$

and nitro, and with (*c*) a basic catalyst selected from the class consisting of tertiary amines wherein all three normal valencies of the nitrogen atoms are bonded to carbon atoms of hydrocarbon moieties, tri(monovalent hydrocarbon group) phosphines and silylamines represented by the formula:

$$G_mSi(NG_2)_{4-m}$$

wherein G has the meaning defined hereinabove, and $m$ is an integer having the value of zero to 3, (2) heating said mixture to a temperature sufficiently elevated to cause redistribution of the silicon-fluorine and silicon-chlorine bonds in said compounds of Formulas II and III, (3) removing from said mixture a fluorosilane represented by the formula:

(IV) $(Z—R)_iSiF_{4-i}$ wherein R, Z and $i$ have the meanings defined hereinabove, and (4) thereafter recovering from the resulting reaction mixture the product of Formula I.

11. A continuous process for producing an organo-functional chlorosilane represented by the formula:

(I) $(Y—R—)_iSiCl_{4-i}$ wherein R is a divalent hydrocarbon group containing from 1 to 17 carbon atoms, Y is a group selected from the class consisting of hydrogen, fluoro, chloro, bromo, iodo, cyano, $$-COOG-,\quad -NG_2,\quad -\overset{O}{\overset{\|}{C}}-G,\quad -OG,\quad -\overset{O}{\overset{\|}{C}}-NG_2$$

and nitro, G is a monovalent hydrocarbon group containing from 1 to 10 carbon atoms, and $i$ is an integer having a valve from 1 to 3 which process comprises (1) converting by chemical reactions a fluorosilane represented by the formula:

(II) $(Z—R—)_iSiF_{4-i}$ wherein R and $i$ have the meanings defined hereinabove and Z is different from the Y group of the compound of Formula I and is selected from the class consisting of hydrogen, fluoro, chloro, bromo, iodo, cyano, $$-COOG-,\quad -NG_2,\quad -\overset{O}{\overset{\|}{C}}-G,\quad -OG,\quad -\overset{O}{\overset{\|}{C}}-NG_2$$

and nitro and wherein the functionality of the compound of Formula II is the same as the functionality of the desired product of Formula I, to a fluorosilane represented by the formula:

(III) $(Y—R—)_iSiF_{4-i}$ wherein R, Y and $i$ have the meanings defined hereinabove, (2) forming a reactive mixture of (*a*) said fluorosilane of Formula III, (*b*) a chlorosilane represented by the formula:

(IV) $(Z—R—)_iSiCl_{4-i}$ wherein Z, R and $i$ have the meanings defined hereinabove and wherein the functionality of the compound of Formula IV is the same as the functionality of the desired product of Formula I, and (*c*) a basic catalyst selected from the class consisting of tertiary amines wherein all three normal valencies of the nitrogen atoms are bonded to carbon atoms of hydrocarbon moieties, tri(monovalent hydrocarbon group) phosphines and silylamines represented by the formula:

$$G_mSi(NG_2)_{4-m}$$

wherein G has the meaning defined hereinabove, and $m$ is an integer having the value of zero to 3, (3) heating said mixture to a temperature between about −20° C. and about 200° C. to cause redistribution of the silicon-fluorine and silicon-chlorine bonds in said compounds of Formulas III and IV, (4) removing from said mixture a fluorosilane represented by the formula:

(II) $(Z—R—)_iSiF_{4-i}$ wherein R, Z and $i$ have the meanings defined hereinabove, (5) thereafter recovering from the resulting reaction mixture the product of Formula I, and (6) recycling the fluorosilane removed in step (4) thereby providing the fluorosilane of Formula II required in step (1).

12. A continuous process for producing nitrophenyltrichlorosilane which comprises (1) converting by chemical reaction phenyltrifluorosilane to nitrophenyltrifluorosilane, (2) forming a reactive mixture of nitrophenyltrifluorosilane, phenyltrichlorosilane and tri-n-butylamine, (3) heating said mixture to a temperature between about −20° C. and 200° C. to cause redistribution of the silicon-chlorine and silicon-fluorine bonds in said mixture, (4) removing phenyltrifluorosilane from said mixture, (5) thereafter recovering nitrophenyltrichlorosilane from the resulting reaction mixture, and (6) recycling the phenyltrifluorosilane removed in step (4) for use in step (1).

13. A continuous process for producing bis(nitrophenyl)dichlorosilane which comprises (1) converting by chemical reaction bis(phenyl)difluorosilane to bis(nitrophenyl)difluorosilane, (2) forming a reactive mixture of bis(nitrophenyl)difluorosilane, bis(phenyl)dichlorosilane and tri-n-hexylamine, (3) heating said mixture to a temperature between about −20° C. and about 200° C. to cause redistribution of the silicon-chlorine and silicon-fluorine bonds in said mixture, (4) removing bis(phenyl) difluorosilane from said mixture, (5) thereafter recovering bis(nitrophenyl)dichlorosilane from the resulting reaction mixture and (6) recycling the bis(phenyl)difluorosilane removed in step (4) for use in step (1).

14. A continuous process for producing gamma-cyanopropylmethyldichlorosilane which comprises (1) converting by chemical reaction methyldifluorosilane to gamma-cyanopropylmethyldifluorosilane, (2) forming a reactive mixture of gamma-cyanopropylmethyldifluorosilane, methyldichlorosilane and tri-n-butylamine, (3) heating said mixture to a temperature between about −20° C. and about 200° C. to cause redistribution of silicon-chlorine and silicon-fluorine bonds in said mixture, (4) removing methyldifluorosilane from said mixture, (5) thereafter recovering gamma-cyanopropylmethyldichlorosilane from the resulting mixture and (6) recycling the methyldifluorosilane removed in step (4) for use in step (1).

15. A process for the separation of a halosilane from a mixture thereof with other halosilanes having higher functionality, said mixture consisting essentially of (*a*) as the major component thereof a halosilane represented by the formula:

(I) $$(Y\text{—}R\text{—})_g\overset{\overset{R'_h}{|}}{Si}Q_{4-g-h}$$

wherein R is a divalent hydrocarbon group, Y is a group selected from the class consisting of hydrogen, fluoro, chloro, bromo, iodo, cyano,

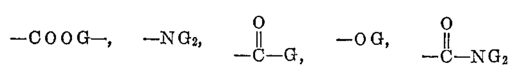

and nitro, G is a monovalent hydrocarbon group, R′ is selected from the class consisting of hydrogen, the vinyl group and Y—R— groups, Q is selected from the class consisting of chlorine, bromine and iodine, *g* is an integer having a value from 1 to 3, *h* is an integer having a value from 0 to 1, and the sum of *g* and *h* is never greater than 3, and (*b*) as the minor component thereof at least one halosilane represented by the formula:

(II) $$(Y\text{—}R\text{—})_t\overset{\overset{R'_u}{|}}{Si}Q_{4-t-u}$$

wherein Y, R, R′ and Q have the meanings defined hereinabove, *t* is an integer having a value from 0 to 2, *u* is an integer having a value from 0 to 1 and the sum of *t* and *u* is never greater than 2, and wherein the functionality of said halosilanes of Formula II is higher than the functionality of said halosilane of Formula I, which process comprises (1) adding to said halosilane mixture (*c*) at least one source of fluorine selected from the group consisting of hydrogen fluoride, alkali metal fluorosilicates, metal fluorides, and fluorosilanes having higher boiling points than the halosilanes of said mixture and represented by the formula:

(III) $$(Z\text{—}R\text{—})_t\overset{\overset{R''_u}{|}}{Si}F_{4-t-u}$$

wherein R, *t* and *u* have the meanings defined hereinabove, Z is a group selected from the class consisting of hydrogen, fluoro, chloro, bromo, iodo,

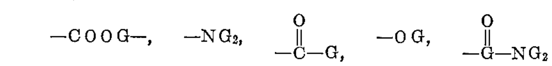

and nitro, G is a monovalent hydrocarbon group and R″ is selected from the class consisting of hydrogen, the vinyl group and Z—R— groups, the quantity of said source of fluorine being such as to provide about one mole of available fluorine per mole of silicon-halogen bonds in said halosilanes of Formula II, and (*d*) a catalyst selected from the class consisting of tertiary amines wherein all three normal valencies of the nitrogen atoms are bonded to carbon atoms of hydrocarbon moieties, tri(monovalent hydrocarbon group) phosphines and silylamines represented by the formula:

$$G_mSi(NG_2)_{4-m}$$

wherein G has the meaning defined hereinabove, and *m* is an integer having the value of zero to 3, (2) heating the composite mixture to a temperature sufficiently elevated to form silicon-fluorine bonds and to cause redistribution of the silicon-fluorine and other silicon-halogen bonds of the compounds in said composite mixture, (3) removing from said composite mixture relatively more volatile fluorosilanes represented by the formula:

(IV) $$(Y\text{—}R\text{—})_t\overset{\overset{R'_u}{|}}{Si}F_{4-t-u}$$

wherein R, R′, Y, *t* and *u* have the meanings defined hereinabove, and (4) thereafter recovering from the resulting reaction mixture the halosilane of Formula I.

16. A process for the separation of a chlorosilane from a mixture thereof with other chlorosilanes having higher functionality, said mixture consisting essentially of (*a*) as the major component thereof a chlorosilane represented by the formula:

(I) $$(Y\text{—}R\text{—})_g\overset{\overset{R'_h}{|}}{Si}Cl_{4-g-h}$$

wherein R is a divalent hydrocarbon group, Y is a group selected from the class consisting of hydrogen, fluoro, chloro, bromo, iodo, cyano,

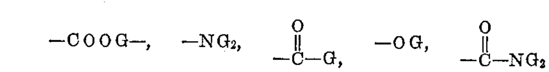

and nitro, G is a monovalent hydrocarbon group, R′ is selected from the class consisting of hydrogen, the vinyl group and Y—R— groups, *g* is an integer having a value from 1 to 3, *h* is an integer having a value from 0 to 1, and the sum of *g* and *h* is never greater than 3, and (*b*) as the minor component thereof at least one chlorosilane represented by the formula:

(II) $$(Y\text{—}R\text{—})_t\overset{\overset{R'_u}{|}}{Si}Cl_{4-t-u}$$

wherein Y, R and R′ have the meanings defined hereinabove, *t* is an integer having a value from 0 to 2, *u* is an integer having a value from 0 to 1 and the sum of *t* and *u* is never greater than 2, and wherein the functionality of said chlorosilanes of Formula II is higher than the functionality of said chlorosilane of Formula I, which process comprises (1) adding to said chlorosilane mixture (*c*) at least one source of fluorine selected from the group consisting of hydrogen fluoride, alkali metal fluorosilicates, metal fluorides, and fluorosilanes having higher boiling points than the chlorosilanes of said mixture and represented by the formula:

$$\text{(III)}\qquad (Z{-}R{-})_t\overset{R''_u}{\overset{|}{Si}}F_{4-t-u}$$

wherein R, *t* and *u* have the meanings defined hereinabove, Z is a group selected from the class consisting of hydrogen, fluoro, chloro, bromo, iodo, $$-COOG-,\quad -NG_2,\quad -\overset{O}{\overset{\|}{C}}-G,\quad -OG,\quad -\overset{O}{\overset{\|}{C}}-NG_2$$

and nitro, G is a monovalent hydrocarbon group and R'' is selected from the class consisting of hydrogen, the vinyl group and Z—R— groups, the quantity of said source of fluorine being such as to provide about one mole of available fluorine per mole of silicon-chlorine bonds in said chlorosilanes of Formula II, and (*d*) a catalyst selected from the class consisting of tertiary amines wherein all three normal valencies of the nitrogen atoms are bonded to carbon atoms of hydrocarbon moieties, tri(monovalent hydrocarbon group) phosphines and silylamines represented by the formula:

$$G_mSi(NG_2)_{4-m}$$

wherein G has the meaning defined hereinabove, and *m* is an integer having the value of zero to 3, (2) heating the composite mixture to a temperature sufficiently elevated to form silicon-fluorine bonds and to cause redistribution of the silicon-fluorine and silicon-chlorine bonds of the compounds in said composite mixture, (3) removing from said composite mixture relatively more volatile fluorosilanes represented by the formula:

$$\text{(IV)}\qquad (Y{-}R{-})_t\overset{R'_u}{\overset{|}{Si}}F_{4-t-u}$$

wherein R, R', Y, *t* and *u* have the meanings defined hereinabove, and (4) thereafter recovering from the resulting reaction mixture the chlorosilane of Formula I.

17. A process for the separation of chlorosilanes from a mxture thereof with other chlorosilanes having higher functionality, said mixture consisting essentially of (*a*) as the major component thereof a chlorosilane represented by the formula:

$$\text{(I)}\qquad (Y{-}R{-})_g\overset{R'_h}{\overset{|}{Si}}Cl_{4-g-h}$$

wherein R is a divalent hydrocarbon group containing from 1 to 17 carbon atoms, Y is a group selected from the class consisting of hydrogen, fluoro, chloro, bromo, iodo, cyano, $$-COOG,\quad -NG_2,\quad -\overset{O}{\overset{\|}{C}}-G,\quad -OG,\quad -\overset{O}{\overset{\|}{C}}-NG_2$$

and nitro, G is a monovalent hydrocarbon group containing from 1 to 10 carbon atoms, R' is selected from the class consisting of hydrogen, the vinyl group and Y—R— groups, *g* is an integer having a value from 1 to 3, *h* is an integer having a value from 0 to 1, and the sum of *g* and *u* is never greater than 3, and (*b*) as the minor component thereof at least one chlorosilane represented by the formula:

$$\text{(II)}\qquad (Y{-}R{-})_t\overset{R'_u}{\overset{|}{Si}}Cl_{4-t-u}$$

wherein Y, R, and R' have the meanings defined hereinabove, *t* is an integer having a value from 0 to 2, *u* is an integer having a value from 0 to 1 and the sum of *t* and *u* is never greater than than 2, and wherein the functionality of said chlorosilanes of Formula II is higher than the functionality of said chlorosilane of Formula I which process comprises (1) adding to said chlorosilane mixture (*c*) at least one fluorosilane having a higher boiling point than the chlorosilanes in said mixture and represented by the formula:

$$\text{(III)}\qquad (Z{-}R{-})_t\overset{R''_u}{\overset{|}{Si}}F_{4-t-u}$$

wherein R, *t* and *u* have the meanings defined hereinabove, Z is a group selected from the class consisting of hydrogen, fluoro, chloro, bromo, iodo, cyano, $$-COOG-,\quad -NG_2,\quad -\overset{O}{\overset{\|}{C}}-G,\quad -OG,\quad -\overset{O}{\overset{\|}{C}}-NG_2$$

and nitro, G has the meaning defined hereinabove and R'' is selected from the class consisting of the vinyl group and Z—R— groups, the quantity of said fluorosilane being such as to provide about one mole of available fluorine per mole of silicon-chlorine bonds in said chlorosilanes of Formula II, and (*d*) a tertiary amine catalyst, all three normal valencies of the nitrogen atoms in said amine being bonded to carbon atoms of hydrocarbon moieties, (2) heating the composite mixture to a temperature between about —20° C. and about 200° C. to cause redistribution of the silicon-fluorine and silicon-chlorine bonds of the compounds in said composite mixture, (3) removing from said composite mixture relatively more volatile fluorosilanes represented by the formula:

$$\text{(IV)}\qquad (Y{-}R{-})_t\overset{R'_u}{\overset{|}{Si}}F_{4-t-u}$$

wherein R, R', Y, *t* and *u* have the meanings defined hereinabove, and (4) thereafter recovering from the resulting reaction mixture the chlorosilane of Formula I.

18. A process for separating phenylmethyldichlorosilane from a mixture consisting essentially of a major amount of phenylmethyldichlorosilane and a minor amount of phenyltrichlorosilane which comprises (1) adding to said mixture sodium fluorosilicate in an amount sufficient to provide at least about one mole of fluorine per mole of silicon-chlorine bonds in said phenyltrichlorosilane and N,N-diethylaniline catalyst, (2) heating the composite mixture to a temperature between about —20° C. and about 200 C. to form silicon-fluorine bonds and to cause redistribution of the silicon-fluorine and silicon-chlorine bonds in said composite mixture, (3) removing phenyltrifluorosilane from said mixture and (4) thereafter recovering phenylmethyldichlorosilane from the resulting reaction mixture.

19. A process for separating dimethyldichlorosilane from a mixture consisting essentially of a major amount of dimethyldichlorosilane and a minor amount of methyltrichlorosilane which comprises (1) adding to said mixture phenyltrifluorosilane in an amount sufficient to provide at least about one mole of silicon-fluorine bonds per mole of silicon-chlorine bonds in said methyltrichlorosilane and N,N-diethylaniline catalyst, (2) heating the composite mixture to a temperature between about —20° C. and about 200° C. to cause redistribution of the silicon-fluorine and silicon-chlorine bonds in said composite mixture, (3) removing methyltrifluorosilane from said mixture, and (4) thereafter recovering dimethyldichlorosilane from the resulting reaction mixture.

20. A process for separating diphenyldichlorosilane from a mixture consisting essentially of a major amount of diphenyldichlorosilane and a minor amount of bis-(trichlorosilyl)benzene which comprises (1) adding to said mixture sodium fluorosilicate in an amount sufficient to provide at least about one mole of fluorine per mole of silicon-chlorine bonds in said bis(trichlorosilyl)benzene and tri-n-heptylamine catalyst, (2) heating the composite mixture to a temperature between about −20° C. and about 200° C. to form silicon-fluorine bonds and to cause redistribution of the silicon-fluorine and silicon-chlorine bonds in said composite mixture, (3) removing bis(trifluorosilyl)benzene from said mixture, and (4) thereafter recovering diphenyldichlorosilane from the resulting reaction mixture.

References Cited in the file of this patent

UNITED STATES PATENTS

| | | |
|---|---|---|
| 2,395,826 | Hill et al. | Mar. 5, 1946 |
| 2,449,815 | Newkirk | Sept. 21, 1948 |
| 3,020,302 | Bailey et al. | Feb. 6, 1962 |

FOREIGN PATENTS

| | | |
|---|---|---|
| 761,205 | Great Britain | Nov. 14, 1956 |